United States Patent
Wang et al.

(10) Patent No.: US 9,416,312 B2
(45) Date of Patent: Aug. 16, 2016

(54) RARE EARTH IONS DOPED SILICATE LUMINESCENT GLASS AND PREPARATION METHOD THEREOF

(71) Applicant: Sun Yat-Sen University, Guangzhou (CN)

(72) Inventors: Jing Wang, Guangzhou (CN); Xuejie Zhang, Guangzhou (CN); Lin Huang, Guangzhou (CN); Qiang Su, Guangzhou (CN)

(73) Assignee: Sun Yat-Sen University (CN)

( * ) Notice: Subject to any disclaimer, the term of this patent is extended or adjusted under 35 U.S.C. 154(b) by 114 days.

(21) Appl. No.: 14/397,929

(22) PCT Filed: Apr. 10, 2013

(86) PCT No.: PCT/CN2013/073989
§ 371 (c)(1),
(2) Date: Oct. 30, 2014

(87) PCT Pub. No.: WO2014/134854
PCT Pub. Date: Sep. 12, 2014

(65) Prior Publication Data
US 2015/0123035 A1    May 7, 2015

(30) Foreign Application Priority Data

Mar. 5, 2013 (CN) .......................... 2013 1 0069174

(51) Int. Cl.
*C03C 3/095*   (2006.01)
*C09K 11/77*   (2006.01)
*C03C 4/12*    (2006.01)

(52) U.S. Cl.
CPC ............ *C09K 11/7738* (2013.01); *C03C 3/095* (2013.01); *C03C 4/12* (2013.01); *C03C 2204/00* (2013.01)

(58) Field of Classification Search
CPC ....................................................... C03C 4/12
See application file for complete search history.

(56) References Cited

U.S. PATENT DOCUMENTS 8,004,196 B2 *  8/2011  Fechner ................. C03C 3/091
                                                        313/493

FOREIGN PATENT DOCUMENTS

| CN | 101104547 A | 1/2008 |
|----|-------------|--------|
| CN | 101749642 A | 6/2010 |
| CN | 101830638 A | 9/2010 |
| CN | 102701590 A | 10/2012 |

OTHER PUBLICATIONS

Andrade et al., "Tunable light emission and similarities with garnet structure of Ce-doped LSCAS glass for white-light devices", Journal of Alloys and Compounds, vol. 510, 2012, pp. 54-59.

(Continued)

*Primary Examiner* — Carol M Koslow
(74) *Attorney, Agent, or Firm* — Lerner, David, Littenberg, Krumholz & Mentlik, LLP

(57) ABSTRACT

A rare earth ions doped luminescent silicate glass is provided having the general formula of: $45SiO_2\text{-}aLi_2O\text{-}bMO\text{-}5Al_2O_3\text{-}3K_2O\text{-}2P_2O_5\text{:}cEu_2O_3$, wherein a is molar ratio of $Li_2O$, b is molar ratio of MO and c is molar ratio of $Eu_2O_3$, wherein $a+b=45$, $25\le a\le 35$ and $0.025\le c\le 0.50$, and wherein MO is one or more of alkaline earth metal oxides. The luminescent glass can be prepared by simple progress, without pollution and at low cost. The resulting glass can be excited by UV LED chip and blue LED chip. Bright green light can be obtained by the sample under excitation of UV LED chip, while bright white light can be obtained under excitation of blue LED chip. The luminescent glass can be coupled with LED to obtain novel LED devices and provides potential applications in the field of semiconductor lighting.

8 Claims, 3 Drawing Sheets

(56) References Cited

OTHER PUBLICATIONS

International Search Report for Application No. PCT/CN2013/073989 dated Dec. 12, 2013.

Liu, Zijun et al., "Super broadband reddish emitting glass with Eu2+ doped for warm-white light emitting diodes", Applied Physics A: Materials Science & Processing, (2012) 108: 777-781.

* cited by examiner

RARE EARTH IONS DOPED SILICATE LUMINESCENT GLASS AND PREPARATION METHOD THEREOF

CROSS-REFERENCE TO RELATED APPLICATIONS

The present application is a national phase entry under 35 U.S.C. §371 of International Application No. PCT/CN2013/073989 filed Apr. 10, 2013, which claims priority from Chinese Patent Application No. 201310069174.9 filed on Mar. 5, 2013.

FIELD OF THE INVENTION

The present invention relates to the field of white-light-emitting glass, and in particular, to a rare earth ions doped silicate luminescent glass and used for white-light-emitting diode (WLED), and the preparation method thereof.

BACKGROUND OF THE INVENTION

WLED is a novel solid state lighting source, which is efficient, energy saving and friendly to the environment. Therefore, it is expected to be the fourth-generation lighting source to provide "green lighting".

Currently commercialized solutions for providing white light by WLED device comprise: "blue LED+yellow phosphor", "blue LED+yellow+red phosphor" or "blue LED+green+red phosphor". Although these phosphors provide high luminous efficiency, they have the following deficiencies: (a) poor thermal stability, which causes drift of white light; (b) easy aging of fluorescent paste formed by combination with epoxy resin.

Compared to phosphors, rare earth ions doped luminescent glasses provides many advantages in preparing WLED: (a) easy machining into various shapes and good plasticity; (b) good thermal conductivity and chemical stability; (c) simple processing, readily available materials and low cost; (d) ability to replace epoxy resin. Therefore, rare earth ions doped luminescent glasses provide high application value.

There have been many studies on luminescent glasses, but there are only a few of luminescent glasses which can actually be excited by blue LED chip (440~480 nm). Chinese patent No. 101830638 A reported a $Eu^{2+}$ singly doped luminescent glass, which has an optimal excitation wavelength at 349 nm. Chinese patent No. 102701590 A reported a high silica luminescent glass, which has an optimal excitation wavelength extended to be 350~390 nm. Chinese patent No. 101749642 A reported a luminescent glass excited by blue light, which has an optimal excitation wavelength extended to blue light region (about 440 nm) with the variation in the amount of $B_2O_3$. Recently, L.H.C. Andrade reported the excitation and emission spectra of 41.5$Al_2O_3$-47.4CaO-7$SiO_2$-2.1MgO-2.0$CeO_2$ (wt. %) (Journal of Alloys and Compounds 510 (2012) 54-59), which has an optimal excitation wavelength at 405 nm. Zijun Liu reported the excitation and emission spectra of 27$Al_2O_3$-58CaO-8$SiO_2$-7MgO-x$Eu_2O_3$ (mol %) (Appl Phys A (2012) 108:777-781), which has an optimal excitation wavelength extended to blue light region (about 440 nm).

In the above mentioned luminescent glasses, some of them have an excitation wavelength which can not be well matched with the emission band of blue LED chip, while the others still have low luminous efficiency. In conclusion, up to now there is no patent or other publications related to the series of luminescent glasses provided by the present invention.

SUMMARY OF THE INVENTION

The present invention focuses on the development of a novel series of luminescent glasses with high efficiency, which can be excited by blue LED chip.

A luminescent glass is provided by the present invention, wherein the general formula of chemical constitution of the luminescent glass is:

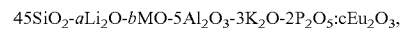

45$SiO_2$-$a$$Li_2O$-$b$MO-5$Al_2O_3$-3$K_2O$-2$P_2O_5$:$c$$Eu_2O_3$, wherein a is the molar ratio of $Li_2O$, b is the molar ratio of MO, and c is the molar ratio of $Eu_2O_3$, wherein a+b=45 and 0.025≤c≤0.50, and wherein MO is one or more of alkaline earth metal oxides.

Preferably, the molar ratio a is 25 to 35.

Preferably, the alkaline earth metal oxide is one or more of calcium oxide, strontium oxide and barium oxide.

A method for the preparation of the above mentioned luminescent glass is also provided, comprising the steps of:

S1: providing oxides or salts of respective elements according to the molar ratios in the general formula, followed by grinding and mixing;

S2: melting at high temperature under reducing atmosphere;

S3: pouring into a preheated mould, annealing, cooling, cutting and polishing.

Preferably, the salts in step S1 are carbonates or phosphates.

Preferably, the reducing atmosphere in step S2 is thermal-carbon, pure hydrogen or mixed gas of nitrogen and hydrogen.

Preferably, the high temperature in step S2 is 1450 to 1700° C. for 0.5 to 3 hours.

Preferably, the annealing in step S3 is carried out at 450 to 650° C. for 2 to 5 hours.

Compared to the luminescent glasses which have already been published by the patents and literatures, the luminescent glass provided by the present invention provides the following advantages:

1. The luminescent glass provided by the present invention has a broad absorption band ranging from the UV region to blue light region, which is suitable for both the excitation of UV LED chip and blue LED chip. Bright green light emission can be obtained by the combination of the present luminescent glass and UV LED chip, while bright white light emission can be obtained by the combination of the present luminescent glass and blue LED chip.

2. Continuous adjustability in the excitation spectra can be provided with the variation in doped amount of $Eu_2O_3$, which allows the optimal excitation wavelength adjustable within 410~470 nm, suitable for application of UV LED and blue LED at various wavelength.

3. Continuous adjustability in the emission spectra can be provided with the variation in doped amount of $Eu_2O_3$ and variation of MO (M=Ca, Sr, Ba), which allows the peak emission wavelength adjustable within 500~555 nm, providing light from green to yellowish green.

4. Adjustability of the emission wavelength can be obtained by fixing the doped amount of $Eu_2O_3$ and changing the excitation wavelength, which allows the peak emission wavelength adjustable within 500~545 nm, providing light from green to yellowish green.

DETAILED DESCRIPTION OF THE INVENTION

In the following descriptions, the present invention will be further described in combination with specific examples, which is exemplary and is not limiting the scope of the present invention.

Example 1

Synthesis of Luminescent Glass Based on $45SiO_2$-$25Li_2O$-$20SrO$-$5Al_2O_3$-$3K_2O$-$2P_2O_5$:$0.025Eu_2O_3$

TABLE 1

Compositions of the rare earth ions doped silicate luminescent glass of Example 1.

| material | $SiO_2$ | $Li_2O$ | SrO | $Al_2O_3$ | $K_2CO_3$ | $NH_4H_2PO_4$ | $Eu_2O_3$ |
|---|---|---|---|---|---|---|---|
| weight (g) | 5.4076 | 1.4941 | 4.1448 | 1.0196 | 0.8292 | 0.9202 | 0.0176 |

Silicon dioxide ($SiO_2$), lithium oxide ($Li_2O$), strontium oxide (SrO), aluminum oxide ($Al_2O_3$), potassium carbonate ($K_2CO_3$), ammonium dihydrogen phosphate ($NH_4H_2PO_4$) and $Eu_2O_3$ were accurately weighed according to table 1. The materials were fully grinded and mixed for 6 hours in a ball mill, and then transferred into a crucible and kept at 1450° C. for 3 hours under reducing atmosphere of thermal-carbon. The resulting glass liquid was poured into a preheated mould for shaping, and then annealed at 450° C. for 5 hours, and took out after naturally cooled to room temperature, after which it was cut and polished to give luminescent glass sample.

Figure 1:
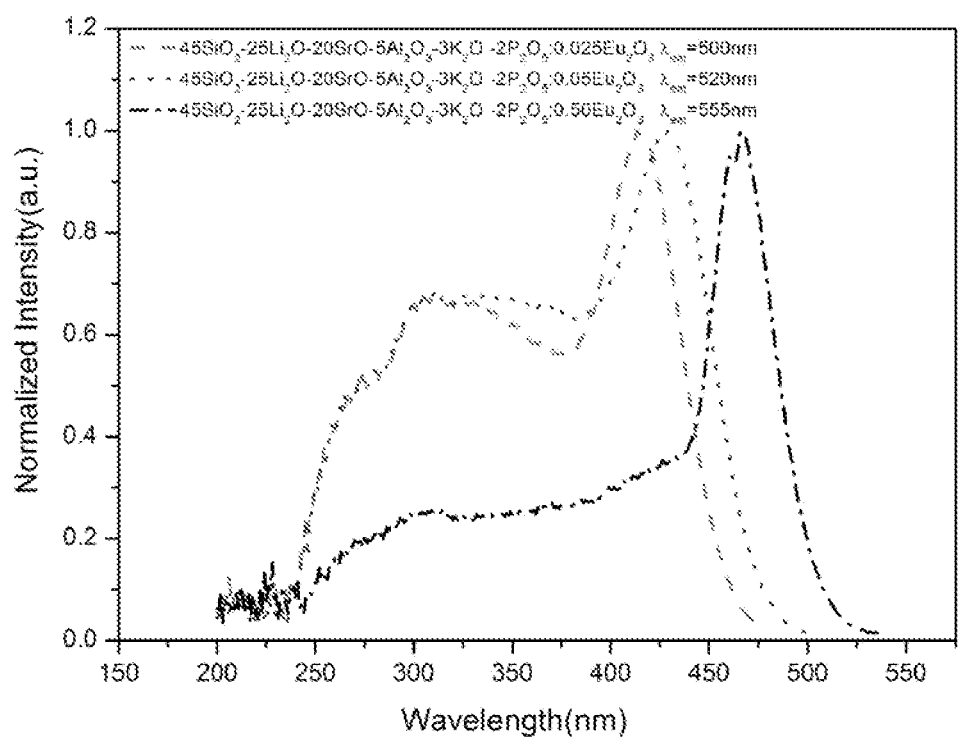
FIG. 1 shows the excitation spectra of glass samples with different concentrations of $Eu_2O_3$ (Example 1: $45SiO_2$-$25Li_2O$-$20SrO$-$5Al_2O_3$-$3K_2O$-$2P_2O_5$:$0.025Eu_2O_3$; Example 2: $45SiO_2$-$25Li_2O$-$20SrO$-$5Al_2O_3$-$3K_2O$-$2P_2O_5$:$0.05Eu_2O_3$; Example 3: $45SiO_2$-$25Li_2O$-$20SrO$-$5Al_2O_3$-$3K_2O$-$2P_2O_5$: $0.50Eu_2O_3$).
Figure 2:
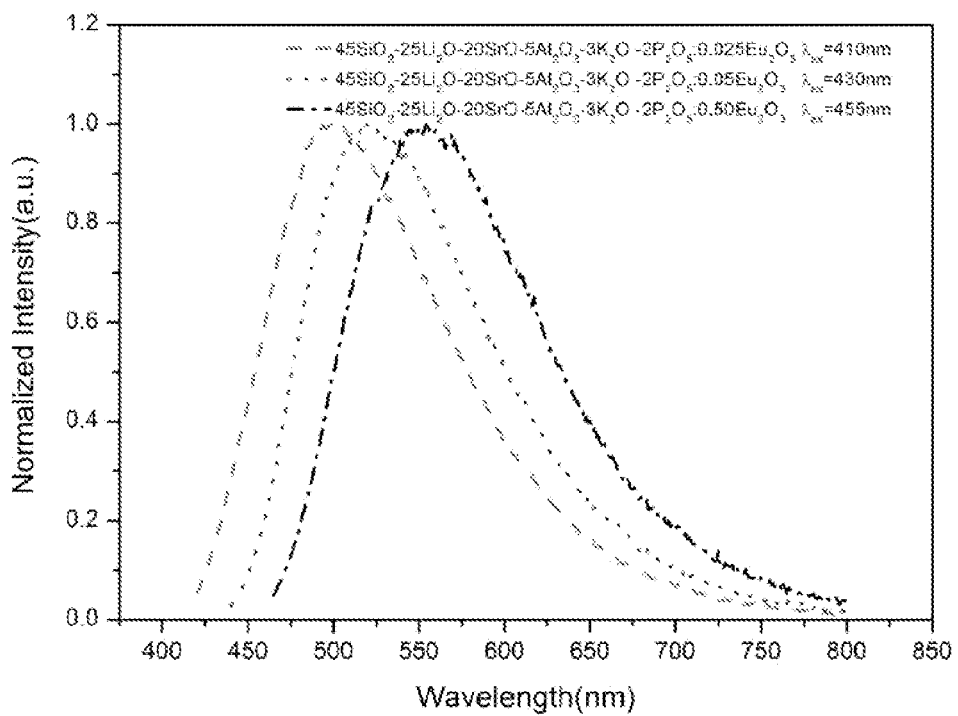
FIG. 2 shows the emission spectra of glass samples with different concentrations of $Eu_2O_3$ (Example 1: $45SiO_2$-$25Li_2O$-$20SrO$-$5Al_2O_3$-$3K_2O$-$2P_2O_5$:$0.025Eu_2O_3$; Example 2: $45SiO_2$-$25Li_2O$-$20SrO$-$5Al_2O_3$-$3K_2O$-$2P_2O_5$:$0.05Eu_2O_3$; Example 3: $45SiO_2$-$25Li_2O$-$20SrO$-$5Al_2O_3$-$3K_2O$-$2P_2O_5$: $0.50Eu_2O_3$).

The optimal excitation wavelength of the resulting glass is at 410 nm (shown in FIG. 1), while the main emission peak is at 500 nm under excitation of light at 410 nm (shown in FIG. 2).

Example 2

Synthesis of Luminescent Glass Based on $45SiO_2$-$25Li_2O$-$20SrO$-$5Al_2O_3$-$3K_2O$-$2P_2O_5$:$0.05Eu_2O_3$

TABLE 2

Compositions of the rare earth ions doped silicate luminescent glass of Example 2.

| material | $SiO_2$ | $Li_2CO_3$ | $SrCO_3$ | $Al_2O_3$ | $K_2CO_3$ | $NH_4H_2PO_4$ | $Eu_2O_3$ |
|---|---|---|---|---|---|---|---|
| weight (g) | 5.4076 | 3.6945 | 5.9052 | 1.0196 | 0.8292 | 0.9202 | 0.0352 |

Silicon dioxide ($SiO_2$), lithium carbonate ($Li_2CO_3$), strontium carbonate ($SrCO_3$), aluminum oxide ($Al_2O_3$), potassium carbonate ($K_2CO_3$), ammonium dihydrogen phosphate ($NH_4H_2PO_4$) and $Eu_2O_3$ were accurately weighed according to table 2. The materials were fully grinded and mixed for 8 hours in a ball mill, and then transferred into a crucible and kept at 1500° C. for 2 hours under reducing atmosphere of nitrogen ($N_2$)~hydrogen ($H_2$) mixed gas. The resulting glass liquid was poured into a preheated mould for shaping, and then annealed at 500° C. for 4 hours, and took out after naturally cooled to room temperature, after which it was cut and polished to give luminescent glass sample.

Figure 3:
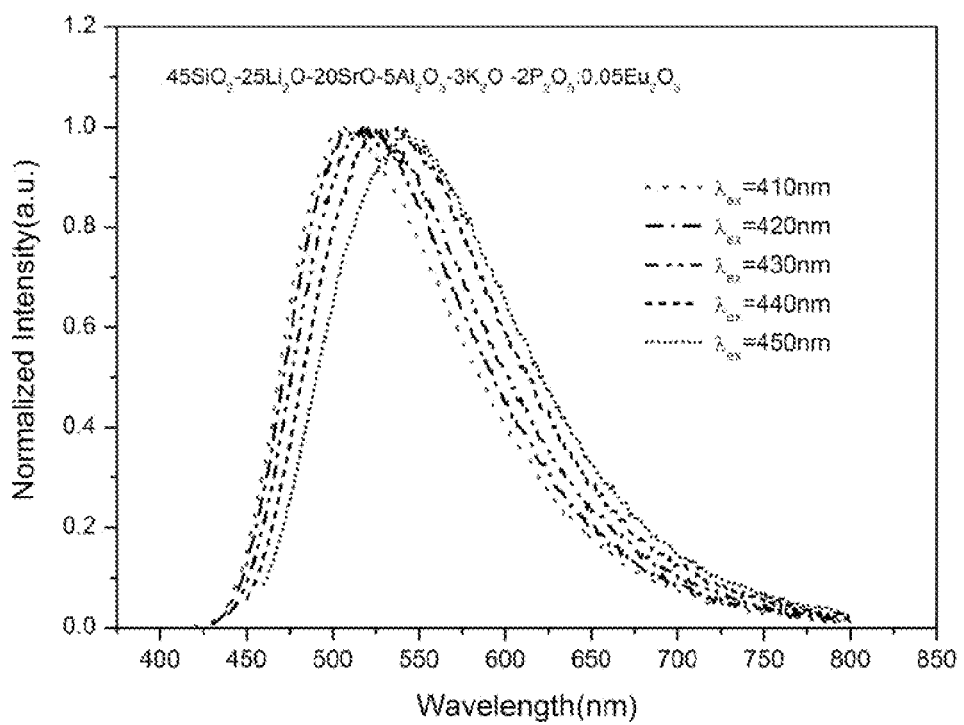
FIG. 3 shows the emission spectra of glass sample $45SiO_2$-$25Li_2O$-$20SrO$-$5Al_2O_3$-$3K_2O$-$2P_2O_5$:$0.05Eu_2O_3$ (Example 2) at different excitation wavelengths.

The optimal excitation wavelength of the resulting glass is at 430 nm (shown in FIG. 1), while the main emission peak is at 520 nm under excitation of light at 430 nm (shown in FIG. 2). Simultaneously, as shown in FIG. 3, the peak emission wavelength transferred from 505 nm to 545 nm when the sample was excited by light at different wavelengths.

Example 3

Synthesis of Luminescent Glass Based on $45SiO_2$-$25Li_2O$-$20SrO$-$5Al_2O_3$-$3K_2O$-$2P_2O_5$:$0.50Eu_2O_3$

TABLE 3

Compositions of the rare earth ions doped silicate luminescent glass of Example 3.

| material | $SiO_2$ | $Li_2CO_3$ | SrO | $Al_2O_3$ | $K_2CO_3$ | $(NH_4)_2HPO_4$ | $Eu_2O_3$ |
|---|---|---|---|---|---|---|---|
| weight (g) | 5.4076 | 3.6945 | 4.1448 | 1.0196 | 0.8292 | 1.0565 | 0.3520 |

Silicon dioxide ($SiO_2$), lithium carbonate ($Li_2CO_3$), strontium oxide (SrO), aluminum oxide ($Al_2O_3$), potassium carbonate ($K_2CO_3$), diammonium phosphate (($NH_4)_2HPO_4$) and $Eu_2O_3$ were accurately weighed according to table 3. The materials were fully grinded and mixed for 10 hours in a ball mill, and then transferred into a crucible and kept at 1550° C. for 1 hour under reducing atmosphere of hydrogen ($H_2$). The resulting glass liquid was poured into a preheated mould for shaping, and then annealed at 550° C. for 2 hours, and took out after naturally cooled to room temperature, after which it was cut and polished to give luminescent glass sample.

The optimal excitation wavelength of the resulting glass is at 440~490 nm (shown in FIG. 1), while the main emission peak is at 550 nm under excitation of light at 455 nm (shown in FIG. 2). Bright white light can be obtained by the combination of the resulting glass and blue LED chip (450 nm).

It is confirmed by Examples 1, 2 and 3 that the luminescent glass provided by the present invention has a broad absorption band ranging from the UV to blue light (shown in FIG. 1), which matches well with the emissions of UV LED chip and blue LED chip; and that continuous adjustability in the excitation spectra can be provided (shown in FIG. 1), which allows the optimal excitation wavelength adjustable within 410~470 nm, suitable for application of UV and blue LED at various wavelength. Continuous adjustability in the emission spectra can be provided (shown in FIG. 2), which allows the peak emission wavelength adjustable within 500~555 nm, providing light from green to yellowish green.

Example 4

Synthesis of Luminescent Glass Based on $45SiO_2$-$30Li_2O$-$15SrO$-$5Al_2O_3$-$3K_2O$-$2P_2O_5$:$0.40Eu_2O_3$

TABLE 4

Compositions of the rare earth ions doped silicate luminescent glass of Example 4.

| material | $SiO_2$ | $Li_2O$ | $SrCO_3$ | $Al_2O_3$ | $K_2CO_3$ | $NH_4H_2PO_4$ | $EU_2O_3$ |
|---|---|---|---|---|---|---|---|
| weight (g) | 5.4076 | 1.7929 | 4.4289 | 1.0196 | 0.8292 | 0.9202 | 0.2815 |

Silicon dioxide ($SiO_2$), lithium oxide ($Li_2O$), strontium carbonate ($SrCO_3$), aluminum oxide ($Al_2O_3$), potassium carbonate ($K_2CO_3$), ammonium dihydrogen phosphate ($NH_4H_2PO_4$) and $Eu_2O_3$ were accurately weighed according to table 4. The materials were fully grinded and mixed for 8 hours in a ball mill, and then transferred into a crucible and kept at 1600° C. for 1 hour under reducing atmosphere of thermal-carbon. The resulting glass liquid was poured into a preheated mould for shaping, and then annealed at 500° C. for 2 hours, and took out after naturally cooled to room temperature, after which it was cut and polished to give luminescent glass sample.

Bright white light can be obtained by the combination of the resulting glass and blue LED chip (450 nm).

Example 5

Synthesis of Luminescent Glass Based on $45SiO_2$-$35Li_2O$-$10SrO$-$5Al_2O_3$-$3K_2O$-$2P_2O_5$:$0.40Eu_2O_3$

TABLE 5

Compositions of the rare earth ions doped silicate luminescent glass of Example 5.

| material | $SiO_2$ | $Li_2O$ | $SrO$ | $Al_2O_3$ | $K_2CO_3$ | $(NH_4)_2HPO_4$ | $Eu_2O_3$ |
|---|---|---|---|---|---|---|---|
| weight (g) | 5.4076 | 2.0917 | 2.0724 | 1.0196 | 0.8292 | 1.0565 | 0.2815 |

Silicon dioxide ($SiO_2$), lithium oxide ($Li_2O$), strontium oxide ($SrO$), aluminum oxide ($Al_2O_3$), potassium carbonate ($K_2CO_3$), diammonium phosphate (($NH_4)_2HPO_4$) and $Eu_2O_3$ were accurately weighed according to table 5. The materials were fully grinded and mixed for 6 hours in a ball mill, and then transferred into a crucible and kept at 1600° C. for 1 hour under reducing atmosphere of thermal-carbon. The resulting glass liquid was poured into a preheated mould for shaping, and then annealed at 600° C. for 2 hours, and took out after naturally cooled to room temperature, after which it was cut and polished to give luminescent glass sample.

Bright white light can be obtained by the combination of the resulting glass and blue LED chip (450 nm).

Example 6

Synthesis of Luminescent Glass Based on $45SiO_2$-$25Li_2O$-$20CaO$-$5Al_2O_3$-$3K_2O$-$2P_2O_5$:$0.05Eu_2O_3$

TABLE 6

Compositions of the rare earth ions doped silicate luminescent glass of Example 6.

| material | $SiO_2$ | $Li_2CO_3$ | $CaCO_3$ | $Al_2O_3$ | $K_2CO_3$ | $NH_4H_2PO_4$ | $EU_2O_3$ |
|---|---|---|---|---|---|---|---|
| weight (g) | 5.4076 | 3.6945 | 4.003 | 1.0196 | 0.8292 | 0.9202 | 0.0352 |

Silicon dioxide ($SiO_2$), lithium carbonate ($Li_2CO_3$), calcium carbonate ($CaCO_3$), aluminum oxide ($Al_2O_3$), potassium carbonate ($K_2CO_3$) ammonium dihydrogen phosphate ($NH_4H_2PO_4$) and $Eu_2O_3$ were accurately weighed according to table 6. The materials were fully grinded and mixed for 8 hours in a ball mill, and then transferred into a crucible and kept at 1700° C. for 0.5 hour under reducing atmosphere of nitrogen ($N_2$)~hydrogen ($H_2$) mixed gas. The resulting glass liquid was poured into a preheated mould for shaping, and then annealed at 650° C. for 2 hours, and took out after naturally cooled to room temperature, after which it was cut and polished to give luminescent glass sample.

Figure 4:
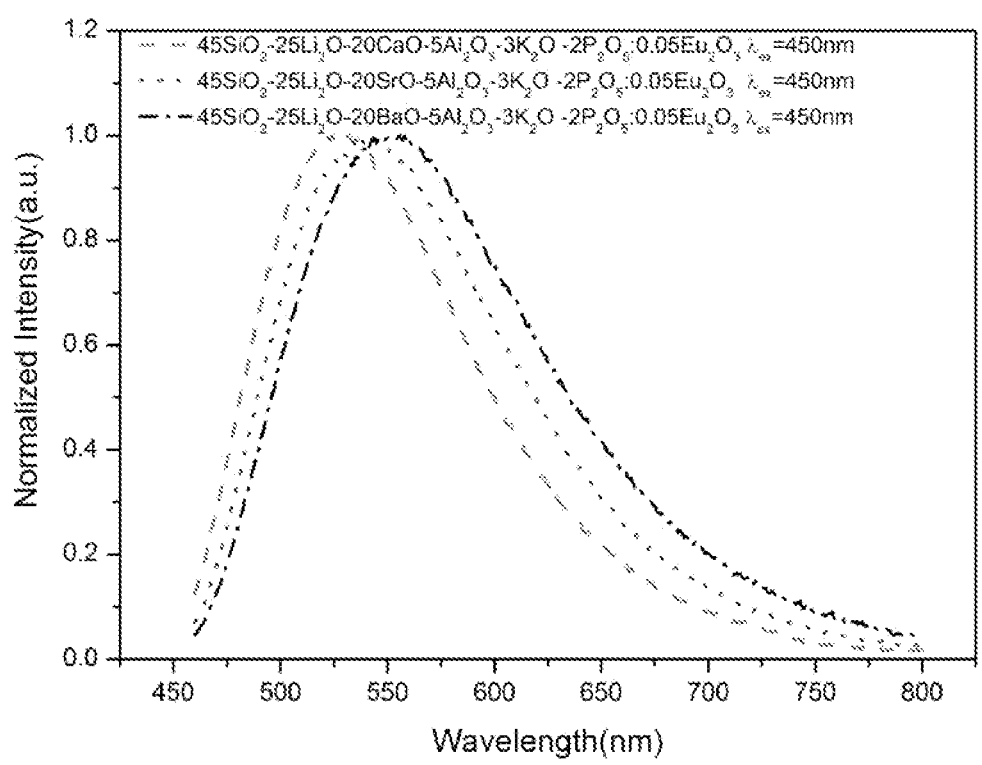
FIG. 4 shows the emission spectra of glass samples with different MO (M=Ca, Sr, Ba) (Example 2: $45SiO_2$-$25Li_2O$-$20SrO$-$5Al_2O_3$-$3K_2O$-$2P_2O_5$:$0.05Eu_2O_3$; Example 6: $45SiO_2$-$25Li_2O$-$20CaO$-$5Al_2O_3$-$3K_2O$-$2P_2O_5$:$0.05Eu_2O_3$; Example 7: $45SiO_2$-$25Li_2O$-$20BaO$-$5Al_2O_3$-$3K_2O$-$2P_2O_5$: $0.05Eu_2O_3$).

The excitation wavelength of the resulting glass is at 250~475 nm, while the main emission peak is at 530 nm under excitation of light at 450 nm (shown in FIG. 4).

Example 7

Synthesis of Luminescent Glass Based on $45SiO_2$-$25Li_2O$-$20BaO$-$5Al_2O_3$-$3K_2O$-$2P_2O_5$:$0.05Eu_2O_3$

TABLE 7

Compositions of the rare earth ions doped silicate luminescent glass of Example 7.

| material | $SiO_2$ | $Li_2O$ | $BaCO_3$ | $Al_2O_3$ | $K_2CO_3$ | $NH_4H_2PO_4$ | $Eu_2O_3$ |
|---|---|---|---|---|---|---|---|
| weight (g) | 5.4076 | 1.4941 | 7.8934 | 1.0196 | 0.8292 | 0.9202 | 0.0352 |

Silicon dioxide ($SiO_2$), lithium oxide ($Li_2O$), barium carbonate ($BaCO_3$), aluminum oxide ($Al_2O_3$), potassium carbonate ($K_2CO_3$), ammonium dihydrogen phosphate ($NH_4H_2PO_4$) and $Eu_2O_3$ were accurately weighed according to table 7. The materials were fully grinded and mixed for 8 hours in a ball mill, and then transferred into a crucible and kept at 1550° C. for 2 hours under reducing atmosphere of thermal-carbon. The resulting glass liquid was poured into a preheated mould for shaping, and then annealed at 550° C. for 4 hours, and took out after naturally cooled to room temperature, after which it was cut and polished to give luminescent glass sample.

The excitation wavelength of the resulting glass is at 250~500 nm, while the main emission peak is at 550 nm under excitation of light at 450 nm (shown in FIG. 4).

It is confirmed by Examples 2, 6 and 7 that there is a red shift in the emission wavelength with variation of Ca→Sr→Ba (as shown in FIG. 4).

Example 8

Synthesis of Luminescent Glass Based on $45SiO_2$-$25Li_2O$-$10SrO$-$10CaO$-$5Al_2O_3$-$3K_2O$-$2P_2O_5$:$0.10Eu_2O_3$

TABLE 8

Compositions of the rare earth ions doped silicate luminescent glass of Example 8.

| material | $SiO_2$ | $Li_2CO_3$ | SrO | CaO | $Al_2O_3$ | $K_2CO_3$ | $(NH_4)_2HPO_4$ | $Eu_2O_3$ |
|---|---|---|---|---|---|---|---|---|
| weight (g) | 5.4076 | 3.6945 | 2.0724 | 1.1215 | 1.0196 | 0.8292 | 1.0565 | 0.0704 |

Silicon dioxide ($SiO_2$), lithium carbonate ($Li_2CO_3$), strontium oxide (SrO), calcium oxide (CaO), aluminum oxide ($Al_2O_3$), potassium carbonate ($K_2CO_3$), diammonium phosphate (($NH_4)_2HPO_4$) and $Eu_2O_3$ were accurately weighed according to table 8. The materials were fully grinded and mixed for 10 hours in a ball mill, and then transferred into a crucible and kept at 1700° C. for 0.5 hour under reducing atmosphere of thermal-carbon. The resulting glass liquid was poured into a preheated mould for shaping, and then annealed at 500° C. for 2 hours, and took out after naturally cooled to room temperature, after which it was cut and polished to give luminescent glass sample.

Bright white light can be obtained by the combination of the resulting glass and blue LED chip (450 nm).

Example 9

Synthesis of Luminescent Glass Based on $45SiO_2$-$30Li_2O$-$5SrO$-$5CaO$-$5BaO$-$5Al_2O_3$-$3K_2O$-$2P_2O_5$:$0.20Eu_2O_3$

TABLE 9

Compositions of the rare earth ions doped silicate luminescent glass of Example 9.

| material | $SiO_2$ | $Li_2CO_3$ | $SrCO_3$ | $CaCO_3$ | $BaCO_3$ | $Al_2O_3$ | $K_2CO_3$ | $NH_4H_2PO_4$ | $Eu_2O_3$ |
|---|---|---|---|---|---|---|---|---|---|
| weight (g) | 5.4076 | 4.4335 | 1.4763 | 1.0009 | 1.9734 | 1.0196 | 0.8292 | 0.9202 | 0.1408 |

Silicon dioxide ($SiO_2$), lithium carbonate ($Li_2CO_3$), strontium carbonate ($SrCO_3$), calcium carbonate ($CaCO_3$), barium carbonate ($BaCO_3$), aluminum oxide ($Al_2O_3$), potassium carbonate ($K_2CO_3$), ammonium dihydrogen phosphate ($NH_4H_2PO_4$) and $Eu_2O_3$ were accurately weighed according to table 9. The materials were fully grinded and mixed for 10 hours in a ball mill, and then transferred into a crucible and kept at 1600° C. for 1 hour under reducing atmosphere of nitrogen ($N_2$)~hydrogen ($H_2$) mixed gas. The resulting glass liquid was poured into a preheated mould for shaping, and then annealed at 550° C. for 2 hours, and took out after naturally cooled to room temperature, after which it was cut and polished to give luminescent glass sample.

Bright white light can be obtained by the combination of the resulting glass and blue LED chip (450 nm).

What is claimed is:

1. A rare earth ions doped luminescent silicate glass used for WLED, having general formula of:

$45SiO_2$-$aLi_2O$-$bMO$-$5Al_2O_3$-$3K_2O$-$2P_2O_5$:$cEu_2O_3$, wherein a is molar ratio of $Li_2O$, b is molar ratio of MO and c is molar ratio of $Eu_2O_3$, wherein a+b=45 and $0.025 \leq c \leq 0.50$, wherein MO is one or more of alkaline earth metal oxides.

2. The luminescent glass of claim 1, wherein the molar ratio a ranges from 25 to 35.

3. The luminescent glass of claim 1, wherein the alkaline earth metal oxide is one or more of calcium oxide, strontium oxide and barium oxide.

4. A method for preparation of the luminescent glass of claim 1, comprising steps of:
- S1: providing oxides or salts of respective elements according to molar ratios in the general formula, followed by grinding and mixing;
- S2: melting at high temperature under reducing atmosphere;
- S3: pouring into a preheated mould, annealing, cooling, cutting and polishing.

5. The method of claim 4, wherein the salts in step S1 are carbonates or phosphates.

6. The method of claim 4, wherein the reducing atmosphere in step S2 is thermal-carbon, pure hydrogen or mixed gas of nitrogen and hydrogen.

7. The method of claim 4, wherein the high temperature in step S2 is 1450 to 1700° C. for 0.5 to 3 hours.

8. The method of claim 4, wherein the annealing in step S3 is carried out at 450 to 650° C. for 2 to 5 hours.

* * * * *